US012762664B2

(12) United States Patent
O'Neil et al.

(10) Patent No.: US 12,762,664 B2
(45) Date of Patent: Oct. 13, 2026

(54) SYSTEM, DEVICES AND/OR PROCESSES FOR APPLICATION OF MACHINE LEARNING TO IMAGE ANTI-ALIASING

(71) Applicant: Arm Limited, Cambridge (GB)

(72) Inventors: Liam James O'Neil, Bedale (GB); Joshua James Sowerby, Twickenham (GB); Matthew James Wash, Stapleford (GB); Samuel James Edward Martin, Waterbeach (GB)

(73) Assignee: Arm Limited, Cambridge (GB)

( * ) Notice: Subject to any disclaimer, the term of this patent is extended or adjusted under 35 U.S.C. 154(b) by 253 days.

(21) Appl. No.: 18/622,311

(22) Filed: Mar. 29, 2024

(65) Prior Publication Data

US 2024/0242314 A1 Jul. 18, 2024

Related U.S. Application Data

(63) Continuation of application No. 17/681,443, filed on Feb. 25, 2022, now Pat. No. 11,954,827.

(51) Int. Cl.
*G06T 5/70* (2024.01)
*G06N 3/08* (2023.01)

(52) U.S. Cl.
CPC ................ *G06T 5/70* (2024.01); *G06N 3/08* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2020/0012761 A1* 1/2020 El-Baz .................. G16B 40/30
2022/0108421 A1* 4/2022 Shacklett ............. G06T 3/4046

OTHER PUBLICATIONS

Yang, et al, "A Survey of Temporal Antialiasing Techniques," Eurographics 2020, vol. 39, No. 2, STAR—State of The Art Report, 15 pages.
Notice of Allowance, U.S. Appl. No. 17/681,443. Mailed Dec. 11, 2023, 14 pages.
Issue Fee, U.S. Appl. No. 17/681,443, filed Mar. 7, 2024, 8 pages.
Issue Notification, U.S. Appl. No. 17/681,443, Mailed Mar. 20, 2024, 2 pages.

* cited by examiner

*Primary Examiner* — Nicholas R Wilson
(74) *Attorney, Agent, or Firm* — Berkeley Law & Technology Group, LLP

(57) ABSTRACT

Example methods, apparatuses, and/or articles of manufacture are disclosed that may be implemented, in whole or in part, techniques to select between and/or among multiple available alternative approaches to perform a temporal anti-aliasing operation in processing an image.

20 Claims, 9 Drawing Sheets

SYSTEM, DEVICES AND/OR PROCESSES FOR APPLICATION OF MACHINE LEARNING TO IMAGE ANTI-ALIASING

This application is a continuation of U.S. patent application Ser. No. 17/681,443, filed Feb. 25, 2022 and titled "SYSTEM, DEVICES AND/OR PROCESSES FOR APPLICATION OF MACHINE LEARNING TO IMAGE ANTI-ALIASING," the subject matter of which is assigned to the assignee of claimed subject matter and incorporated herein by reference in its entirety.

BACKGROUND

1. Field

Techniques, devices and processes for application of an anti-aliasing technique to a rendered image are described.

2. Information

Adaptation of computer-generated imagery to different resolutions (e.g., to small resolutions on mobile gaming platforms) may introduce image aliasing, possibly giving rise to "jaggy" edges in rendered content. Temporal Anti-Aliasing (TAA) processes may be employed to mitigate such aliasing effects by, for example, setting pixel values of averages of sub-pixel samples. Such averages of sub-pixel samples may be determined based, at least in part, on temporal accumulation of such sub-pixel samples.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
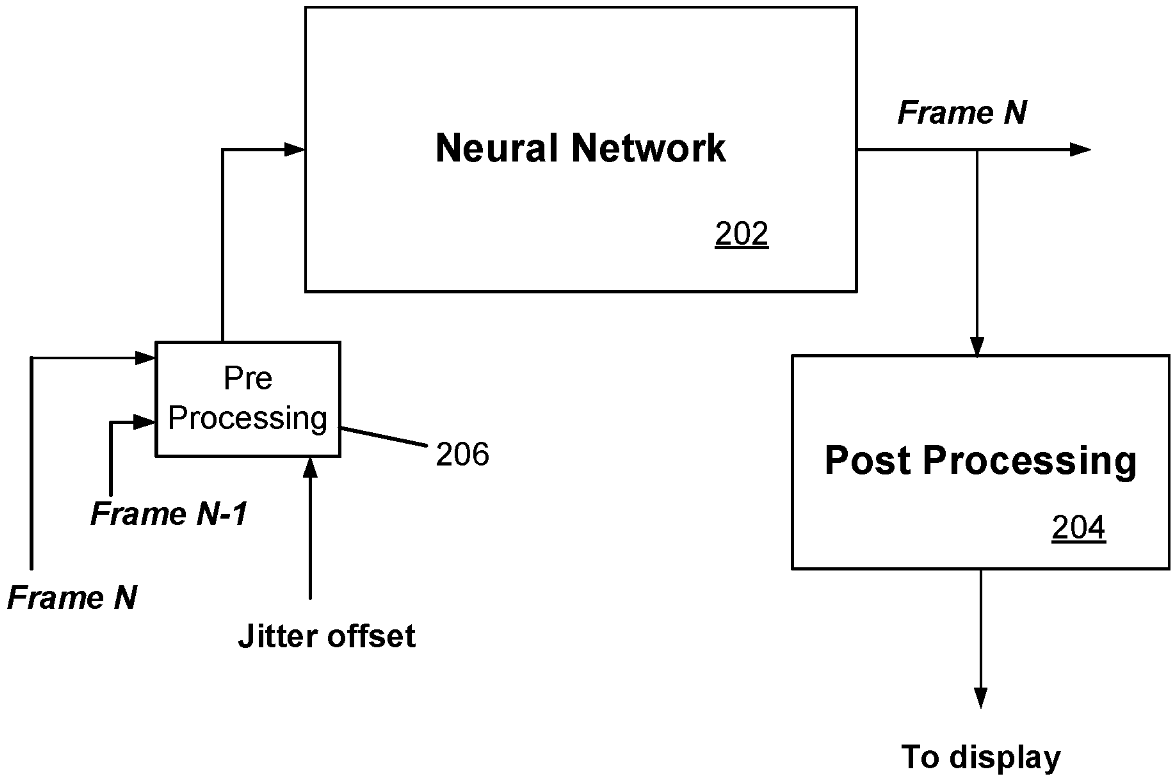
FIG. 1 is a schematic diagram of a system for processing image frames according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, Temporal Anti-Aliasing (TAA) techniques may involve processing of image signal intensity values collected over multiple frames. In an implementation, aliasing may occur if observations and/or samples of an image signal are not obtained at a sufficiently high resolution to avoid distortion and/or artifacts in a reproduced image. To evenly sample different locations within a pixel area, a sub-pixel jitter offset drawn from a sample sequence may be used to shift a viewport temporally on image frames. For example, a viewport sub-pixel jitter offset may be injected to a camera projection matrix to spatially vary different image pixel values in different frames. Samples temporally accumulated from an output of a previous image frame may be reprojected (e.g., resampled) based, at least in part, on application-generated motion vectors to account for camera and/or object motion. Due to changes in occlusion, lighting and/or surface content, for example, a fetched history of image pixel values (e.g., for a previous image) may be invalid and/or inconsistent with image signal intensity values in a current image frame. Application of such invalid image signal intensity values without scrutiny may introduce ghosting and/or image lag artifacts. In a particular implementation, image signal intensity values identified as being invalid may be rejected or rectified. To generate image signal intensity values for a current frame, image signal intensity values (e.g., for particular individual color channels) may be accumulated to provide a history at associated pixel locations.

According to an embodiment, machine-learning techniques may be used in implementing a "super sampling" in computer graphics techniques to facilitate removal of aliased edges/lines giving rise to so-called "jaggies." In a particular implementation, an image may be rendered at a higher-than-displayed resolution, which may be downsampled using a box filter. This approach, however, may be computationally costly, particularly in deferred rendering pipelines, where multiple render targets of a graphics buffer may be stored at a high resolution for subsequent use.

In an implementation, effectiveness of a TAA algorithm may be determined, at least in part, on an ability of such a TAA algorithm to "rectify" a warped anti-aliased history frame. Such a rectification process may involve identifying whether a disocclusion (or warping error) has occurred during reprojection and, in such instances, selecting an alternate color value, known as "clamping" the history. Such a history clamping may rely on rule-defined algorithms which involve computing color and/or depth buffer statistics, and leverage manually tuned heuristics. While such heuristics may be effective in some applications, such heuristics may fall short in image quality in the absence of locality-derived rules. According to an embodiment, such locality-derived rules may be determined, least in part, by training a deep neural network as employed, for example, by NVIDIA's DLSS neural network architecture. In training such a deep neural network (NN), however, complexity may arise in determining and/or obtaining "ground truth" reference image and the "aliased color" training sets, in addition to pre-processing of such training sets.

Briefly, in particular embodiments a densely sampled image frame and a sparsely sampled image frame may be generated based, at least in part, on the same rendered image frame, wherein the sparse image frame and the densely sampled image frame are at a resolution lower than that of the rendered image frame, and the sparse image frame is at a lower resolution than that of the densely sampled image frame. The densely sampled image frame may be applied as a ground truth observation and the sparse image frame may be applied as a training parameter set in training a neural network to predict image signal intensity values. This may enable, for example, a reprojection, rectification and/or accumulation of existing image signal intensity values in a process to train a NN rather than generation of new image signal intensity values for such machine learning operations to train the NN.

FIG. 1 is a schematic diagram of a system 200 for processing image frames according to an embodiment in which a neural network (NN) 202 may predict image signal intensity values associated with pixel locations in an image frame Frame N. According to an embodiment, features of system 200 may be integrated with an electronic device capable of displaying and/or reproducing visual images such as a device capable of generating signals in a particular format to drive a display device. Such a device may comprise, for example, a mobile phone and/or other specialized computing device applicable for gaming, etc.

As shown, NN 202 may determine image signal intensity values of image frame Frame N based, at least in part, on image signal intensity values of frame Frame N−1 and a jitter offset signal. Block 204 may further process image signal intensity values of image frame Frame N for presentation on a display device (e.g., according to a particular image presentation format). Image signal intensity values of a subsequent frame Frame N+1 (not shown) may also be generated based, at least in part, on image signal intensity values of Frame N.

Figure 2A:
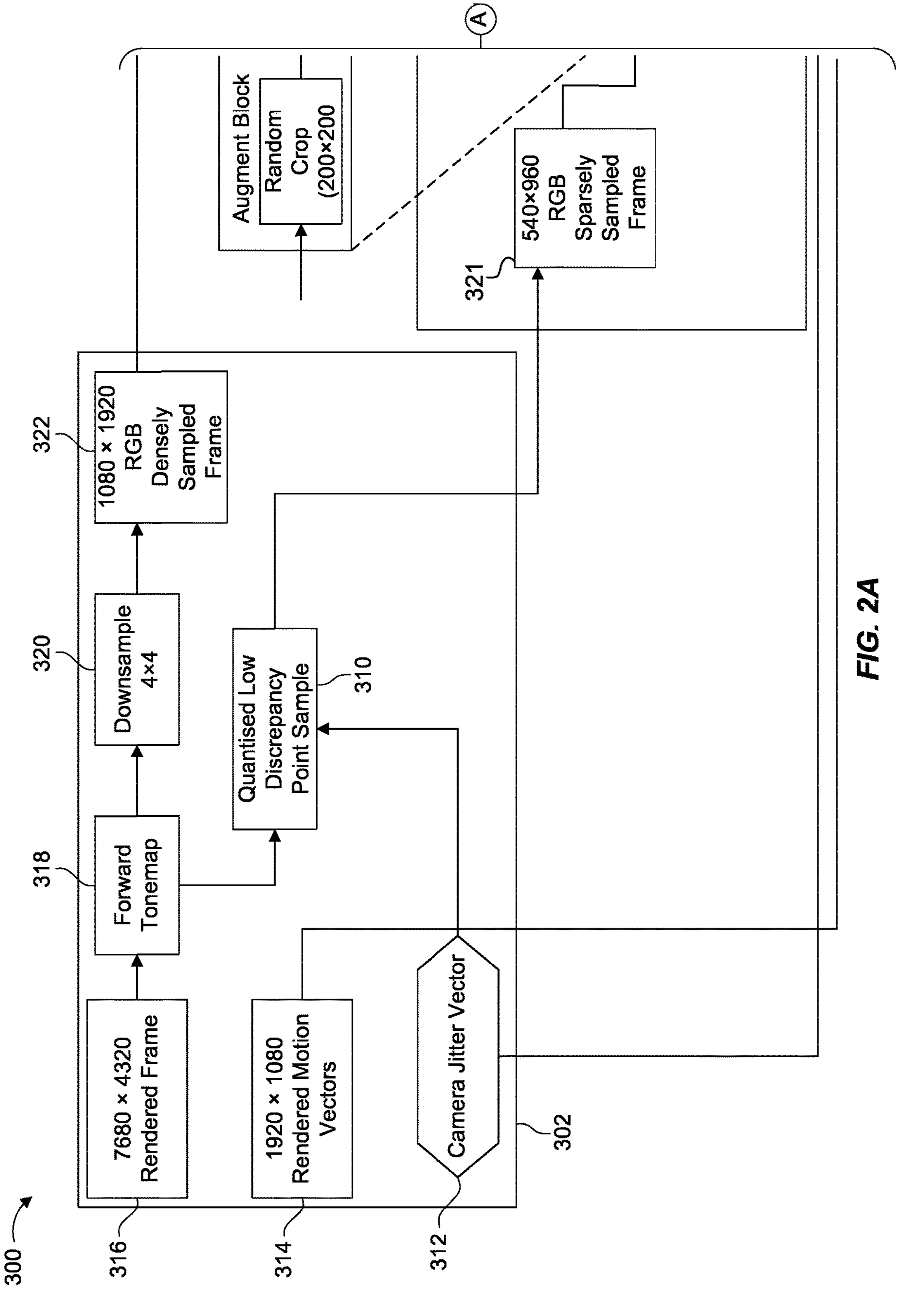
FIGS. 2A, 2B and 2C are a schematic diagram of a system for executing a machine learning operation for development of a device to determine image signal values in an image frame, according to an embodiment.
Figure 2B:
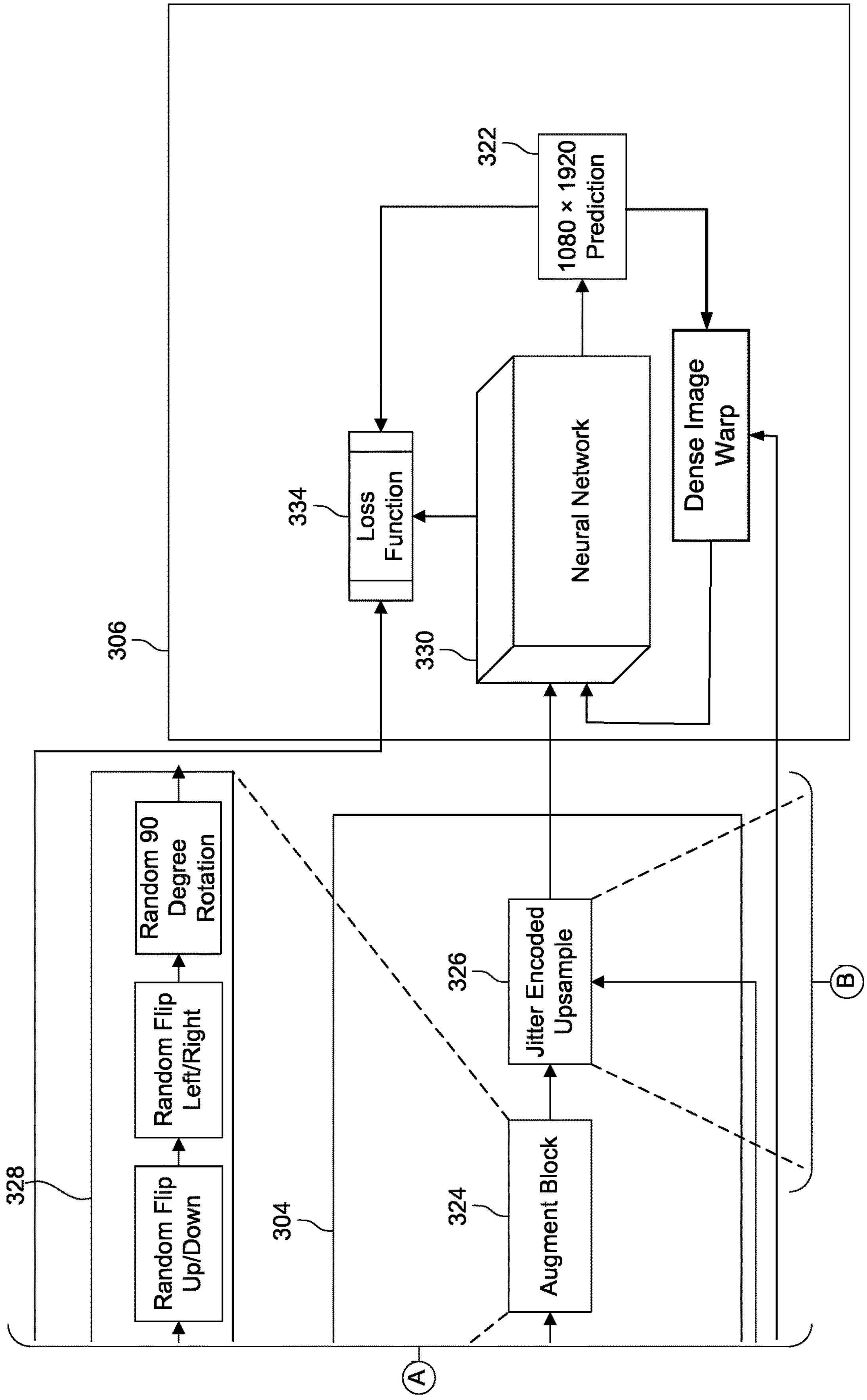
Figure 2C:
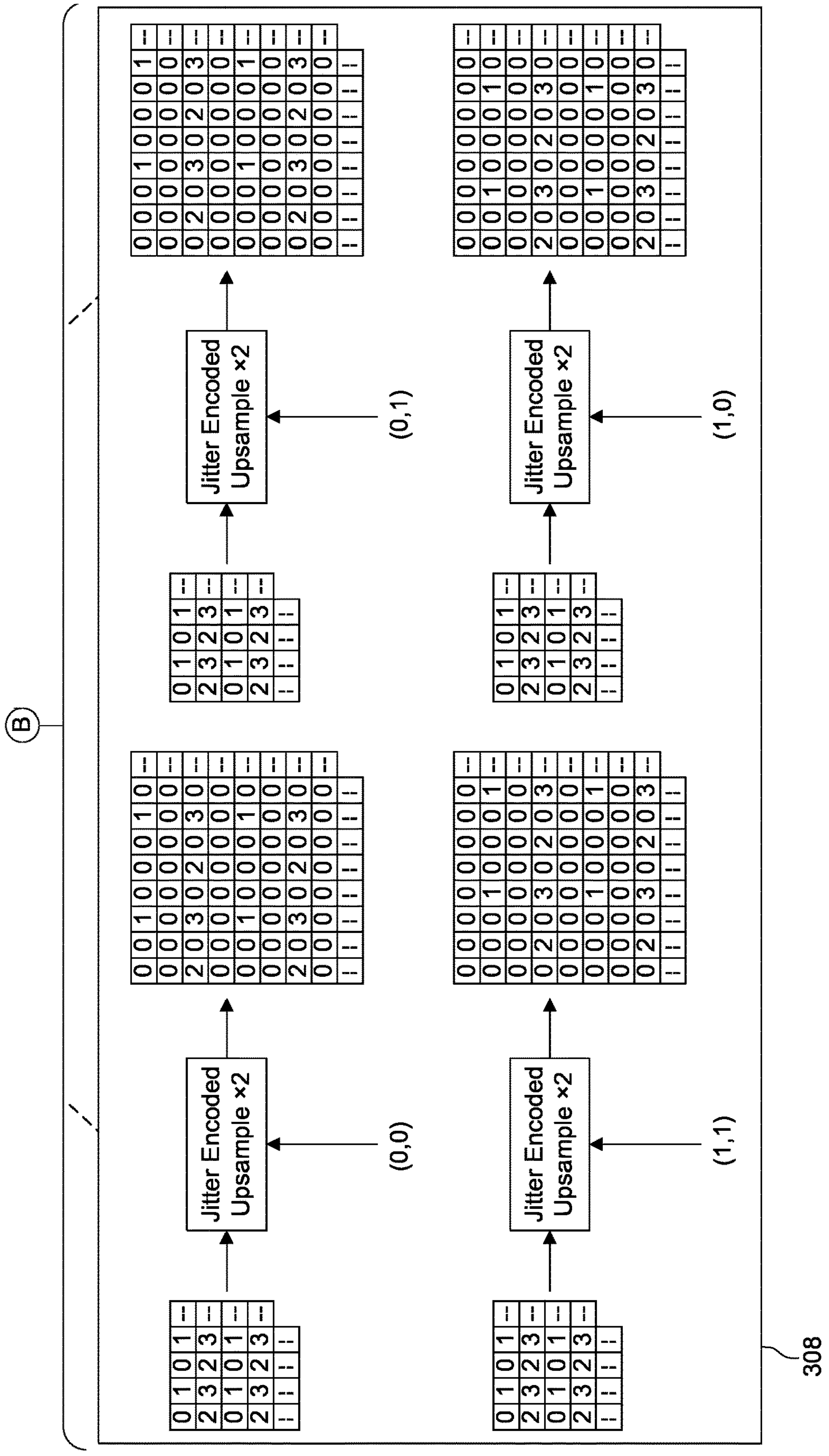

FIG. 2 is a schematic diagram of a system 300 for executing a machine learning operation for development of a device to compute image signal intensity values in an image frame, according to an embodiment. According to an embodiment, system 300 may at least in part enable training operations to determine weights to be associated with nodes and/or edges of an NN (e.g., NN 202) for use in predicting image signal intensity values for pixels of an image frame. For example, recurrent training operation 306 may execute operations to update weights associated with nodes and/or edges of NN 330 on training iterations based on training parameter sets received from pre-processing operations 304. For example, such weights may be updated using back-propagation based, at least in part, on application of a loss function 334 to ground truth (GT) parameters (generated by training set and GT generation operation 302) and predicted image signal intensity values 332 determined on training iterations.

According to an embodiment, training parameter set and GT generation operation 302 may generate a source frame 316 to be rendered at an N multiple higher resolution than a densely sampled image 322 image applied as a ground truth to loss function 334. A sparse image frame 321 may be derived from source frame 316 to be provided as a training image. In the particular illustrated embodiment, source frame 316 includes pixels at a resolution that is 8×8 higher than sparse image frame 321 applied as a training image. Additionally, while source frame 316 may be generated in a high dynamic range (HDR) format, forward tonemap processing 318 may map image signal intensity values of source frame 316 to a finite range to better match source frame 316 to a so-called human visual system (HVS) and simplify application of generated training parameter sets in operations to train NN 330.

Figure 3A:
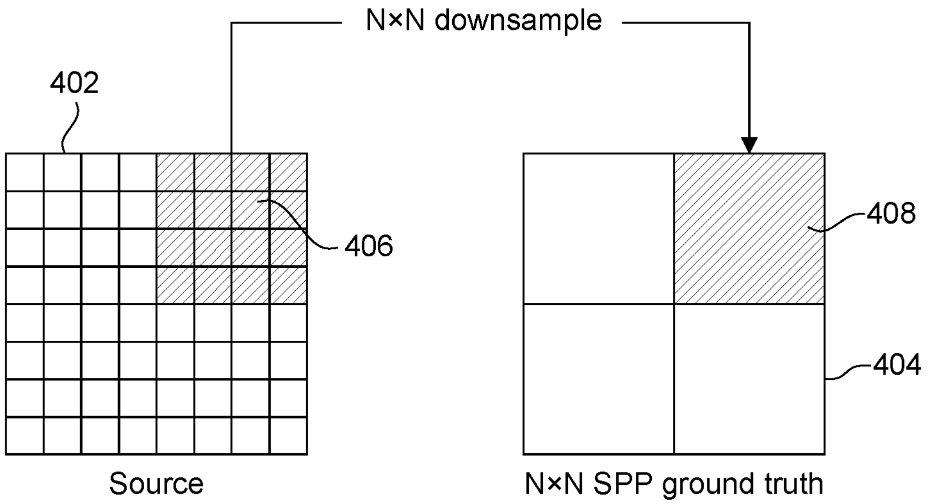
FIGS. 3A, 3B and 3C is a diagram illustrating of features of a process for generating training sets and ground truth parameters for a machine learning operation, according to an embodiment.

According to an embodiment, downsample operation 320 may generate a densely sampled image 322 based, at least in part, on one or more spatial decimation operations. In a particular implementation, downsample operation 320 may execute a filtering operation as illustrated in FIG. 3A to generate a portion of a ground truth frame 404 (e.g., a portion of ground truth 322) based, at least in part, on a corresponding portion of a source frame 402 (e.g., a portion of source frame 316). Here, portion of source frame 402 may be defined, at least in part, by an 8×8 array of pixel locations (and multi-color image signal intensity values associated with such pixel locations). Portion of GT frame 404 may include four pixel locations, where each pixel location corresponds with a 4×4 quadrant of portion of source frame 402. In a particular implementation, image signal intensity values for a pixel location 408 of portion of GT frame 404 may be determined based, at least in part, on image signal intensity values of pixel locations in corresponding quadrant 406 of portion of source frame 402. For example, a red color intensity value for pixel 408 may comprise an average of red color intensity values for pixels in quadrant 406. Similarly, a blue color intensity value for pixel 408 may comprise an average of blue color intensity values for pixels in quadrant 406. Likewise, a green color intensity value for pixel 408 may comprise an average of green color intensity values for pixels in quadrant 406. Red, blue and green intensity values for other pixels in portion of GT frame 404 may be similarly determined based on color intensity values for pixels in corresponding quadrants of portion of source frame 402. It should be understood, however, that this is merely an example of how a GT frame may be generated based on a downsampling of a source frame, and claimed subject matter is not limited in this respect.

Figure 3B:
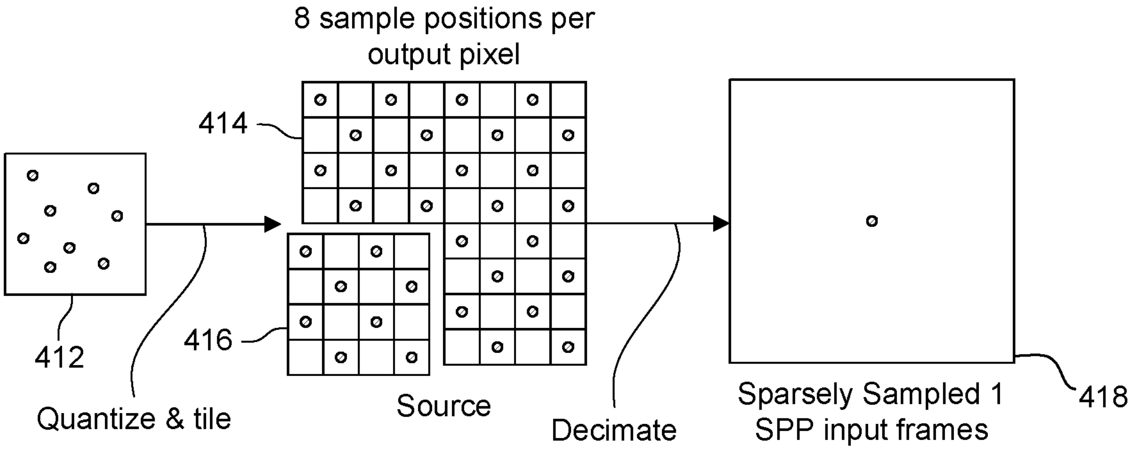

According to an embodiment, pre-processing operations 304 may generate input frames as training parameter sets to be processed by NN 330 in training operations based, at least in part, on high-resolution source frame 316 processed by forward tonemap processing 318. According to an embodiment, jitter encoded upsample operation 326 may generate an input frame based, at least, in part, on a single high-resolution frame provided by training set and GT generation operation 302. In a particular implementation, jitter encoded upsample operation 326 may upsample an input frame, one frame at a time, according to a jitter vector as illustrated in FIG. 3B. Frame portion 414 is shown as including 64 pixels, and multiple such 64-pixel frame portions may be combined to form a single image frame. For each pixel in 64-pixel frame portion 414, associated image signal intensity values may comprise a vector defining red, blue and green color signal intensity values. As shown, image signal intensity values of frame portion 414 may be sampled from selected pixel locations.

According to an embodiment, image signal intensity values of 32 pixels of a 64-pixel frame portion 414 may be selected to populate associated pixel locations of a sequence of 32 sparse frame portions 418. For example, an image signal intensity value of a pixel of 32 pixels in frame portion 414 may populate a corresponding pixel position of a corresponding sparse frame portion 418. In one implementation, image signal intensity values may be selected from pixel locations in frame portion 414 to populate sparse frame portions 418 in a particular order so as to provide a suitable distribution such as a blue noise pattern. In another implementation, a particular sparse frame portion 418 may be encoded as a vector indicating a pixel location (e.g., a location of a corresponding pixel selected from frame portion 414), and red, blue and green color intensity values to be associated with the pixel location.

Figure 3C:
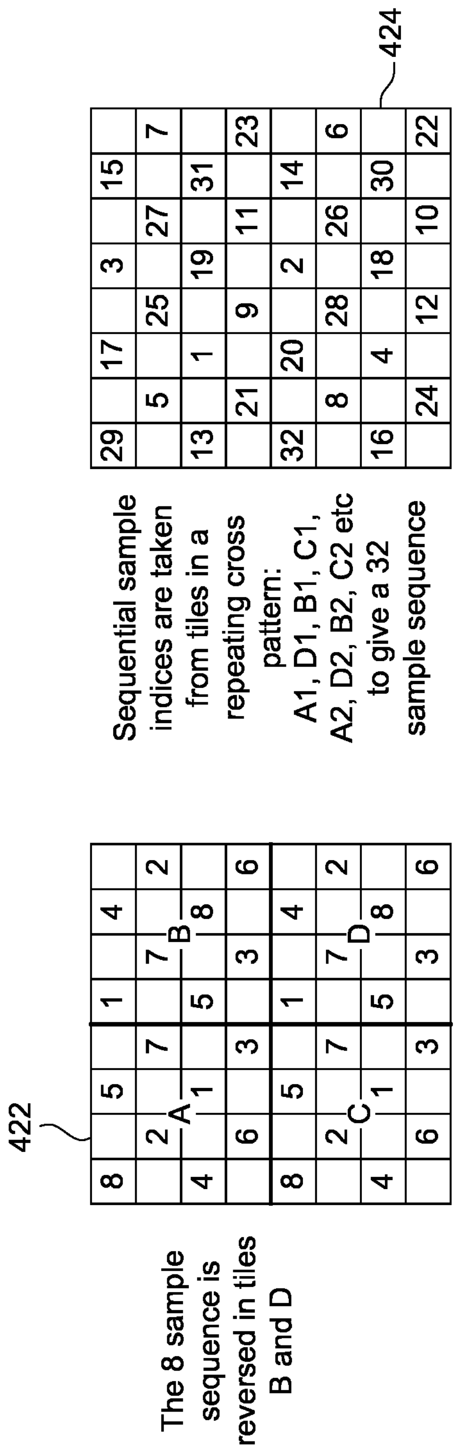

In the particular example illustration of FIG. 3C, frame portion 414 may be mapped to a 64-pixel frame portion 422, which is partitioned into four quadrants with associated labels A, B, C and D. In an embodiment, an order of selection of image signal values to populate sparse frame portions 418 may alternate and/or rotate from selection of image signal values from alternating quadrants A, B, C and D in eight rounds (where image signal values for four pixels are selected to populate sparse frame portions 418 in each round). In a first round, image signal intensity values may be selected from locations A1 (pixel in quadrant A labeled "1"), B1 (pixel in quadrant B labeled "1"), C1 (pixel in quadrant C labeled "1") and D1 (pixel in quadrant D labeled "1"). In a second round, image signal intensity values may be selected from locations A2 (pixel in quadrant A labeled "2"), B2 (pixel in quadrant B labeled "2"), C2 (pixel in quadrant C labeled "2") and D2 (pixel in quadrant D labeled "2"). Numbers in pixel locations of frame portion 424 illustrate an ordering of selection of image signal intensity values from frame portion 422 to populate sparse frame portions 418.

According to an embodiment, an input image frame as training parameters for neural network 330 may be formed by spatially combining a sparse frame portion 418 for a particular time instance with one or more other similarly derived sparse frames for a previous particular time instance. In an embodiment, each of 32 sparse frame portions 418 may be similarly spatially combined with sparse frame portions to form 32 sparse frames to provide a sequence of observations to be processed by neural network 330 in a training iteration.

Figure 4:
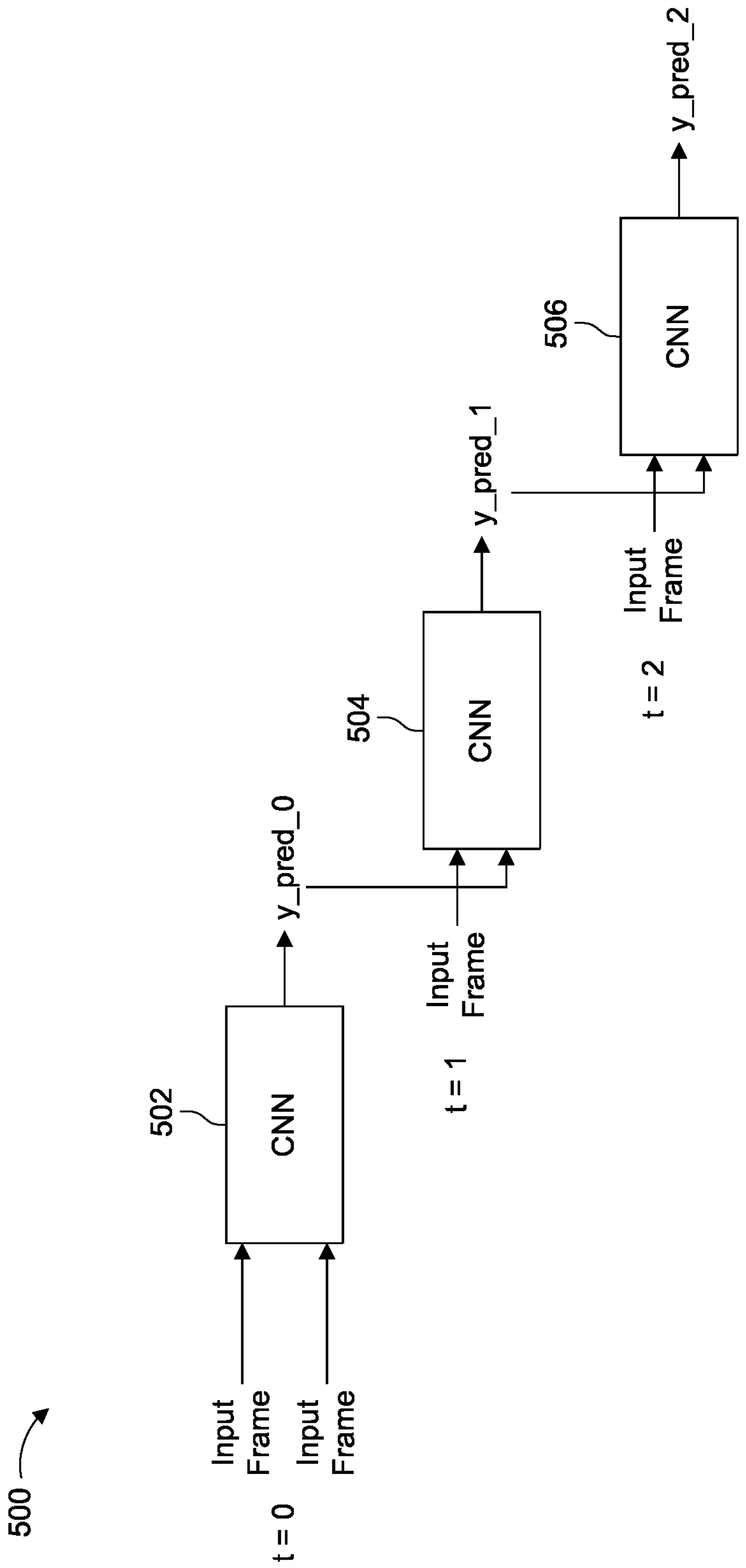
FIG. 4 is a diagram illustrating a progression of operations to be executed in a training iteration of a machine learning operation according to an embodiment.

FIG. 4 is a diagram illustrating a progression of operations to be executed in a training iteration of a machine learning operation according to an embodiment. Such a machine learning operation may be executed by NN 330, for example. As shown, a convolutional neural network (CNN) may recursively generate predictions y_pred_0, y_pred_1 and y_pred_2 from associated inference stages 502, 504 and 506 in an execution of the CNN in a training iteration. Inference stages 502, 504 and 506 may process sparse frames as inputs at times t=0, t=1 and t=2, such as sparse frames produced as shown in FIGS. 3B and 3C. While the particular implementation of FIG. 4 shows three inference stages 502, 504 and 506 to be executed in a single training iteration, other implementations may execute a different number of inference stages in a single training iteration. For example, other implementations may include 32 such inference stages to process 32 corresponding sparse frames (e.g., based on frame portions 418, FIG. 3B) as input signals over a single training iteration.

In a particular implementation, predictions y_pred_0, y_pred_1 and y_pred_2 may comprise estimates of an accumulation of image signal intensity values of associated image frames at times t=0, t=1 and t=2. This may be achieved by recursively feeding back prediction output values of a previous inference stage as an input value for a current inference stage. As such, predictions y_pred_0, y_pred_1 and y_pred_2 may comprise arrays of accumulations of image signal intensity values according to color and pixel location while "Input Frames" may include sparse frames. In an implementation, a CNN inference stage executed in a training iteration may assess whether an image signal value in a predicted accumulation (e.g., computed in a previous CNN inference stage) is the same as corresponding image signal intensity value in a sparse image frame. Execution of an CNN in a machine learning epoch may be recursively repeated for N inference stages over training iterations until termination, at which time a loss function may be computed based, at least in part, on accumulated image signal intensity values of an Nth output frame. Based, at least in part, on the computed loss function, gradients may be backpropagated across predictions y_pred_0, y_pred_1 and y_pred_2, which make up an accumulated final result of a training iteration.

Figure 5:
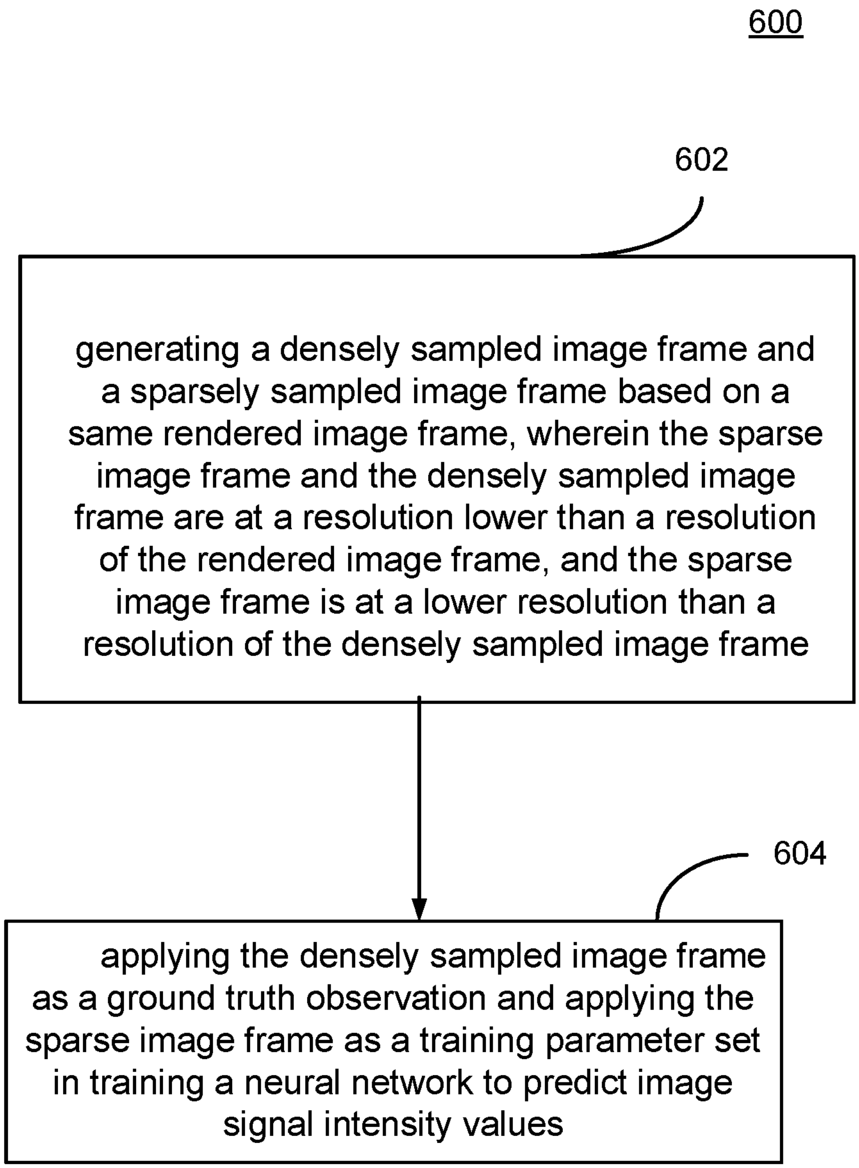
FIG. 5 is a flow diagram of a process for a machine learning operation, according to an embodiment.

FIG. 5 is a flow diagram of a process 600 for a machine learning operation, according to an embodiment. In a particular implementation, process 600 may be performed, in whole or in part, by features of system 300. Block 602 may comprise generation of a densely sampled image frame, such as densely sampled image frame 322, based on a rendered image frame, such as rendered image frame 316. Such a densely sampled image frame may have a lower resolution than a resolution the rendered image frame. Block 602 may also comprise generation of a sparsely sampled image frame such as sparsely sampled image frame 321 based on the same rendered image frame. In this context, such a sparsely sampled image frame may be expressed as one or more arrays of values where at least some of the values associated with pixel locations an array associated with a color channel are assigned a null and/or zero value. Such a sparsely sampled image frame may also have a resolution that is lower than the resolution of the rendered image frame. As shown in the particular example of system 300, rendered image frame 316 may have a resolution of 7680×4320.

As shown in FIG. 3A, block 602 may determine image signal intensity values for a color channel over a pixel in a densely sampled image 404 by averaging corresponding image signal intensity values for that color channel over a region in rendered image 402 corresponding to the pixel in densely sampled image 404. Block 602 may obtain image signal intensity values for remaining color channels and pixels in densely sampled image 404 by averaging corresponding image signal intensity values in image 402.

Block 604 may comprise applying a densely sampled image generated at block 602 as a ground truth and a sparsely sampled image frame generated at block 602 as a training set to generate predictions in one or more training iterations. Also in an embodiment, training sets to be applied at block 604 may be generated as sparse frames such as sparse frames formed from sparse frame portions 418 (FIG. 3B). As pointed out above, such sparse frames may be provided as input signals at inference stages 502, 504 and 506 of a training iteration. Block 604 may further apply a loss function (e.g., loss function 334) to predictions (e.g., y_pred_0, y_pred_1 and y_pred_2 generated by inference stages 502, 504 and 506) and a densely sampled image frame generated at block 602 to update NN weights using backpropagation. A particular loss function applied at block 604 may comprise, for example, a least square error loss function. Block 604 may implement other types of loss functions without deviating from claimed subject matter.

As pointed out above, in a training iteration inference stages 502, 504 and 506 may generate predictions y_pred_0, y_pred_1 and y_pred_2 as accumulations of image signal intensity values for pixel locations and color channels of an image frame. Nonetheless, trained NN weights may be applied in a real-time deployment (e.g., at NN 202) for predicting image signal intensity values of a current image frame (e.g., FRAME N) based, at least in part, on image signal intensity values of a previous image frame (e.g., FRAME N−1).

According to an embodiment system 200 and/or 300 may be formed by and/or expressed in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

According to an embodiment, a neural network may comprise a graph comprising nodes to model neurons in a brain. In this context, a "neural network" as referred to herein means an architecture of a processing device defined and/or represented by a graph including nodes to represent neurons that process input signals to generate output signals, and edges connecting the nodes to represent input and/or output signal paths between and/or among the neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented on one or more computing devices such as computing devices shown in FIG. 6. In a particular implementation, numerical weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, an artificial neuron may apply a weight to input signals, and sum weighted input signals to generate a linear combination.

Edges in a neural network connecting nodes may model synapses capable of transmitting signals (e.g., represented by real number values) between neurons. Receiving such a signal at a node in a neural network, the node may perform some computation to generate an output signal (e.g., to be provided to another node in the neural network connected by an edge) based, at least in part, on one or more weights and/or numerical coefficients associated with the node and/or edges providing the output signal. In a particular implementation of a training mode, such weights and/or numerical coefficients may be adjusted and/or updated as learning progresses. For example, such a weight may increase or decrease a strength of an output signal. In an implementation, transmission of an output signal from a node in a neural network may be inhibited if a strength of the output signal does not exceed a threshold value.

According to an embodiment, a neural network may be structured in layers such that a node in a particular neural network layer may receive output signals from one or more nodes in a previous layer in the neural network, and provide an output signal to one or more nodes in a subsequent layer in the neural network. One specific class of layered neural networks may comprise a convolutional neural network (CNN) or space invariant artificial neural network (SIANN) that enables deep learning. Such CNNs and/or SIANNs may be based on a shared-weight architecture of convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, systems 200 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or subobjects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

FIG. 5 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Figure 6:
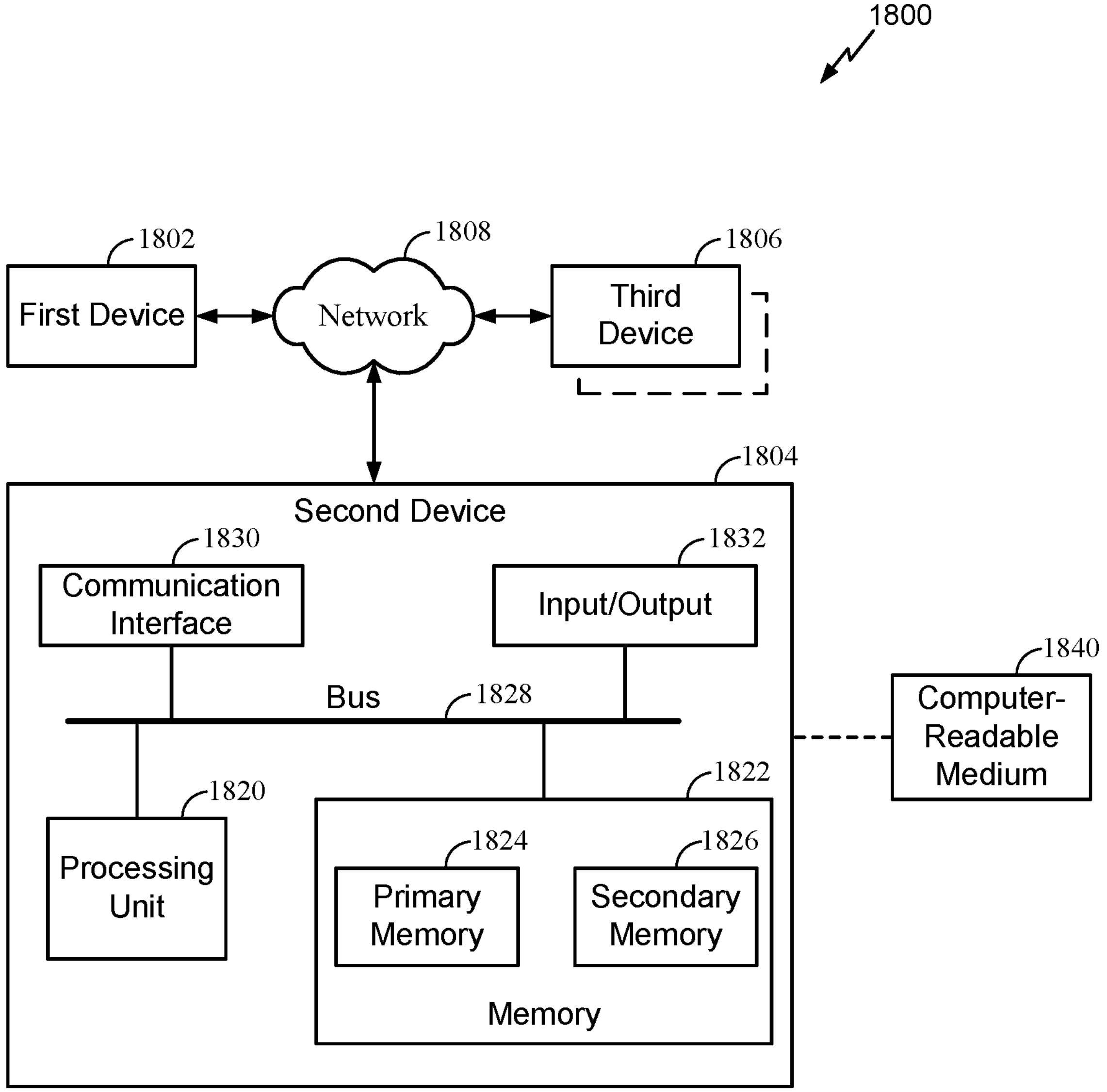
FIG. 6 an example computing system in accordance with an implementation.

Example devices in FIG. 6 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 2 through 5 and in the text associated with the foregoing figure(s) of the present patent application.

Referring now to FIG. 6, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 6, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 5, is merely one example, and claimed subject matter is not limited in scope to this particular example. FIG. 6 may further comprise a communication interface 1830 which may comprise circuitry and/or devices to facilitate transmission of messages between second device 1804 and first device 1802 and/or third device 1806 in a physical transmission medium over network 1808 using one or more network communication techniques identified herein, for example. In a particular implementation, communication interface 1830 may comprise a transmitter device including devices and/or circuitry to modulate a physical signal in physical transmission medium according to a particular communication format based, at least in part, on a message that is intended for receipt by one or more recipient devices. Similarly, communication interface 1830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 6, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 6, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of training a neural network, comprising:

executing a training iteration to update parameters of a neural network to predict image signal intensity values of an image frame, wherein executing the training iteration comprises:

executing the neural network for multiple inferences stages, each inference stage to process image signal intensity values of an associated input image frame in a temporal sequence of image frames to provide a prediction of image values of an associated predicted image frame in the temporal sequence; and for at least one of the multiple inference stages, processing image values of a predicted image frame computed in a previous inference stage as input values in combination with image signal values of an input image frame associated with the at least one of the multiple inference stages to compute a prediction of image values of an image frame in the temporal sequence associated with the at least one of the multiple inference stages.

2. The method of claim 1, wherein the prediction of image values comprises a prediction of an array of accumulations of image signal intensity values of the image frame in the temporal sequence associated with the at least one of the multiple inference stages.

3. The method of claim 1, wherein the image frame in the temporal sequence associated with the at least one of the multiple inference stages comprises a sparse image frame, wherein the sparse image frame is at a resolution lower than a resolution of the associated predicted image frame.

4. The method of claim 1, wherein the neural network is trained to implement a super sampling to increase image resolution.

5. The method of claim 1, wherein the neural network is trained to remove aliased edges.

6. The method of claim 1, wherein the training iteration further comprises:

computing a loss function based, at least in part, on a training set comprising at least a sparse image frame as an input to the neural network and a densely sampled image frame as a ground truth observation; and updating weights of the neural network based, at least in part, an application of backpropagation to the computed loss function.

7. The method of claim 6, wherein the densely sampled image frame and the sparse image frame are derived from a same rendered image frame.

8. The method of claim 7, wherein the sparse image frame is derived as a jitter encoding of a sparse sampling of the same rendered image frame.

9. The method of claim 8, the jitter encoding of the sparse sampling comprises an encoding of one or more non-zero image signal intensity values in the sparse sampling according to pixel locations and magnitudes.

10. A computing device, comprising:

a memory device; and one or more processors couple to the memory device to:

execute a training iteration to update parameters of a neural network to predict image signal intensity values of an image frame, wherein execution of the training iteration comprises:

execution of the neural network for multiple inferences stages, each inference stage to process image signal intensity values of an associated input image frame in a temporal sequence of image frames to provide a prediction of image values of an associated predicted image frame in the temporal sequence; and for at least one of the multiple inference stages, process image values of a predicted image frame computed in a previous inference stage as input values in combination with image signal values of an input image frame associated with the at least one of the multiple inference stages to compute a prediction of image values of an image frame in the temporal sequence associated with the at least one of the multiple inference stages.

11. The computing device of claim 10, wherein the training iteration further comprises:

computation of a loss function based, at least in part, on a training set comprising at least a sparse image frame as an input to the neural network and a densely sampled image frame as a ground truth observation; and update weights of the neural network based, at least in part, an application of backpropagation to the computed loss function.

12. The computing device of claim 11, wherein the densely sampled image frame and the sparse image frame are derived from a same rendered image frame.

13. The computing device of claim 12, wherein the sparse image frame is derived as a jitter encoding of a sparse sampling of the same rendered image frame.

14. The computing device of claim 13, the jitter encoding of the sparse sampling comprises an encoding of one or more non-zero image signal intensity values in the sparse sampling according to pixel locations and magnitudes.

15. The computing device of claim 10, wherein the prediction of image values comprises a prediction of an array of accumulations of image signal intensity values of the image frame in the temporal sequence associated with the at least one of the multiple inference stages.

16. An article, comprising:

a non-transitory storage medium having stored thereon computer-readable instructions that are executable by one or more processors of a computing device to:

execute a training iteration to update parameters of a neural network to predict image signal intensity values of an image frame, wherein execution of the training iteration comprises:

execution of the neural network for multiple inferences stages, each inference stage to process image signal intensity values of an associated input image frame in a temporal sequence of image frames to provide a prediction of image values of an associated predicted image frame in the temporal sequence; and for at least one of the multiple inference stages, process image values of a predicted image frame computed in a previous inference stage as input values in combination with image signal values of an input image frame associated with the at least one of the multiple inference stages to compute a prediction of image values of an image frame in the temporal sequence associated with the at least one of the multiple inference stages.

17. The article of claim 16, wherein the prediction of image values comprises a prediction of an array of accumulations of image signal intensity values of the image frame in the temporal sequence associated with the at least one of the multiple inference stages.

18. The article of claim 16, wherein the image frame in the temporal sequence of image frames associated with the at least one of the multiple inference stages comprises a sparse image frame, wherein the sparse image frame is at a resolution lower than a resolution of the associated predicted image frame.

19. The article of claim 16, wherein the neural network is trained to implement a super sampling to increase image resolution.

20. The article of claim 16, wherein the neural network is trained to remove aliased edges.

* * * * *